United States Patent [19]
Sato

[11] Patent Number: 5,350,188
[45] Date of Patent: Sep. 27, 1994

[54] BAG SUITABLE FOR USE IN AIR BAG APPARATUS

[75] Inventor: Koki Sato, Aichi, Japan

[73] Assignee: Kabushiki Kaisha Tokai-Rika-Denki-Seisakusho, Aichi, Japan

[21] Appl. No.: 846,861

[22] Filed: Mar. 6, 1992

[30] Foreign Application Priority Data

Mar. 8, 1991 [JP] Japan .................. 3-013036

[51] Int. Cl.5 .............................................. B60R 21/30
[52] U.S. Cl. .................... 280/739; 280/743 A
[58] Field of Search ............... 280/728, 730, 733, 739, 280/743, 728 R, 743 A, 743 R

[56] References Cited

U.S. PATENT DOCUMENTS

| | | | |
|---|---|---|---|
| 3,879,056 | 4/1975 | Kawashima et al. | 280/743 A |
| 3,879,057 | 4/1975 | Kawashima et al. | 280/743 A |
| 4,805,930 | 2/1989 | Takada | 280/739 |
| 4,887,842 | 12/1989 | Sato | 280/730 |
| 5,016,913 | 5/1991 | Nakajima et al. | 280/739 |

FOREIGN PATENT DOCUMENTS 3618060 12/1987 Fed. Rep. of Germany ...... 280/739
316557 3/1991 Japan .

*Primary Examiner*—Margaret A. Focarino
*Assistant Examiner*—Paul Dickson
*Attorney, Agent, or Firm*—Sixbey, Friedman, Leedom & Ferguson

[57] ABSTRACT

A bag for an air bag apparatus activated when a vehicle rapidly decelerates is disclosed. The bag includes a plurality of straps and vent holes used for discharging gas. The vent holes are normally blocked by strap valves each of which are sewn to the bag to form a low strength stitch. Each of the strap valves and each of the straps are sewn together to form a high strength stitch. When a separating force produced between each of the straps and the bag reaches a given value upon the rapid deceleration of the vehicle, the low strength stitch is broken to unblock the vent holes. Hence the bag rapidly expands toward the occupant.

13 Claims, 5 Drawing Sheets

BAG SUITABLE FOR USE IN AIR BAG APPARATUS

BACKGROUND OF THE INVENTION

1. Field of the Invention

The present invention relates to a bag which is suitable for use in an air bag apparatus that is activated when a vehicle rapidly decelerates. The bag expands toward a vehicle occupant when a gas is introduced therein.

2. Description of the Related Art

In an air bag apparatus, such as one that is mounted on a steering wheel, an activating device is activated when a vehicle rapidly decelerates. The activating device ignites a detonator disposed within an inflator so as to combust a gas generating material with a explosion inducing agent, thereby producing a large quantity of a gas. The gas thus produced flows into a bag which is stored within a pad in a folded state on the side in which the inflator faces an occupant. Thus, the bag expands and unfolds toward the occupant and breaks the pad so as to be interposed between the steering wheel and the occupant.

Conventionally, this type of bag is provided with circular ventilating apertures (hereinafter called "vent holes") defined thereof on the side opposite that of the occupant. The gas, which flows into the bag at high speed and in large quantity, is discharged by a predetermined amount through the vent holes so as to maintain the bag in an expanded state under a predetermined internal pressure.

However, the gas discharges from the vent holes even before the bag fully expands, i.e., during the expansion of the bag. It is therefore necessary to take desired measures such as a measure for causing directions to exhaust the gases from the inflator to face toward the occupant in large numbers to avoid a delay of the expansion of the bag, a measure for increasing the amount of a gas generating material to be inserted into the inflator.

SUMMARY OF THE INVENTION

With the foregoing in view, it is an object of the present invention to provide a bag suitable for use in an air bag apparatus, which is capable of reliably maintaining an expanded state through a given internal pressure and promptly expand toward an occupant.

According to one aspect of the present invention, there is provided a bag suitable for use in an air bag apparatus activated when a vehicle rapidly decelerates, the bag being accommodated in the apparatus in a folded state and expands toward an occupant when gas flows therein, the bag comprising a connecting member spans portions of the inner surface of the bag, the connecting member serving to restrict the degree of expansion of the bag toward the occupant, an aperture capable of discharging gas therefrom, and blocking means for blocking the aperture and for releasing the aperture from being blocked when a force for separating the connecting member from the bag reaches a predetermined value upon the rapid deceleration of the vehicle, the blocking means being capable of discharging gas from the aperture.

According to the above construction of the present invention, when the vehicle is in a normal running state, the bag is accommodated in the air bag apparatus in a folded state. When the vehicle rapidly decelerates, the air bag apparatus is activated to cause gas to flow into the bag so as to enable the bag to expand toward the occupant. When the gas flows into the bag, the bag expands correspondingly. However, when gas flows into the bag to some degree, a tensile force gradually acts on the connecting member spans portions of the inner surface of the bag. At this time, the aperture is still blocked by the blocking means. Then, the gas is further introduced into the bag from this state so as to cause the blocking means to unblock the aperture with the tensile force applied to the connecting member and a force for pressing the connecting member toward the outside of the bag from the inside thereof, thereby discharging the gas in the bag from the aperture. Accordingly, the internal pressure of the bag does not reach a pressure higher than necessary and hence reaches a given value. As described above, the aperture is unblocked in a state in which the tensile force acting on the connecting member has reached a predetermined value, thereby enabling the bag to be promptly expanded when the vehicle rapidly decelerates.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 4:
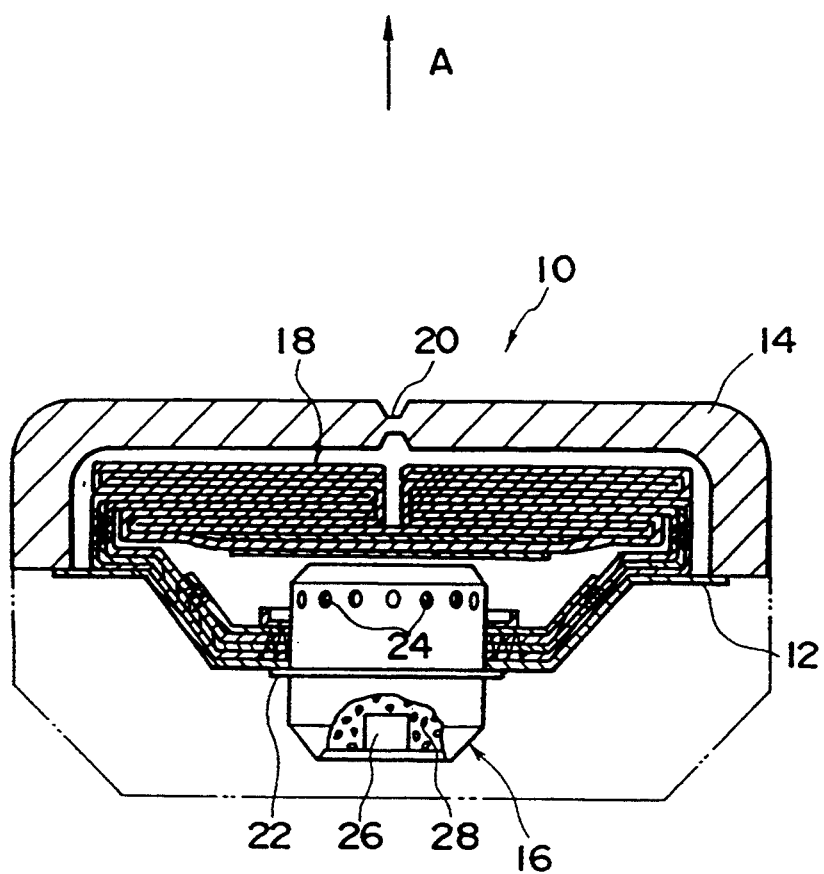
FIG. 4 is a schematic view showing an air bag apparatus in which the bag shown in FIG. 1 is accommodated in a folded state.

FIG. 4 shows an air bag apparatus 10 to which one embodiment of the present invention is applied. The air bag apparatus 10 is of a type which is mounted on a steering wheel unillustrated. The air bag apparatus 10 has a base plate 12 whose central portion is protruded on the side opposite the side of an occupant (i.e., in the direction opposite to the direction indicated by the arrow A shown in FIG. 4). The base plate 12 is supported by and substantially parallel with an unillustrated hub of the steering wheel. Incidentally, the direction indicated by the arrow A in FIG. 4 corresponds to the direction in which a bag 18, to be described later, expands. The base plate 12 is provided with a pad 14, an inflator 16 and the bag 18.

The pad 14 is disposed on the side of the base plate 12 which (i.e., the side indicated by the direction of the arrow A in FIG. 4) faces the occupant. The pad 14 has an unillustrated frame-shaped metal core embedded therein. The pad 14 is fixedly mounted via the core to a peripheral edge of the base plate 12 by rivets or the like. In addition, a thin-wall portion 20 is formed in a portion of the pad 14, which is opposite the base plate 12. The pad 14 is arranged so as to break easily at the thin-wall portion 20.

The inflator 16 is shaped substantially in the form of a cylinder. Half of the inflator 16 on the occupant side extends through a through hole defined in the central portion of the base plate 12. The inflator 16 has a flange 22 formed in an axially-extending intermediate portion thereof and extends in the radial direction of the inflator 16. The flange 22 is fixedly mounted onto the surface of the base plate 12 on the side opposite the side of the occupant by bolts (not shown) or the like. Further, a plurality of gas holes 24 are defined in the circumferential surface of the inflator 16 on the occupant side at predetermined intervals.

The inflator 16 has an activating device 26 incorporated therein at its axial center. In addition, the inflator 16 is filled with gas generating material 28 disposed around the activating device 26. Therefore, when a vehicle rapidly decelerates, the activating device 26 is activated so as to subject the gas generating material 28 to combustion. As a result, the gas generating material 28 generates a large quantity of gas which expands the bag 18 toward the occupant.

Figure 1:
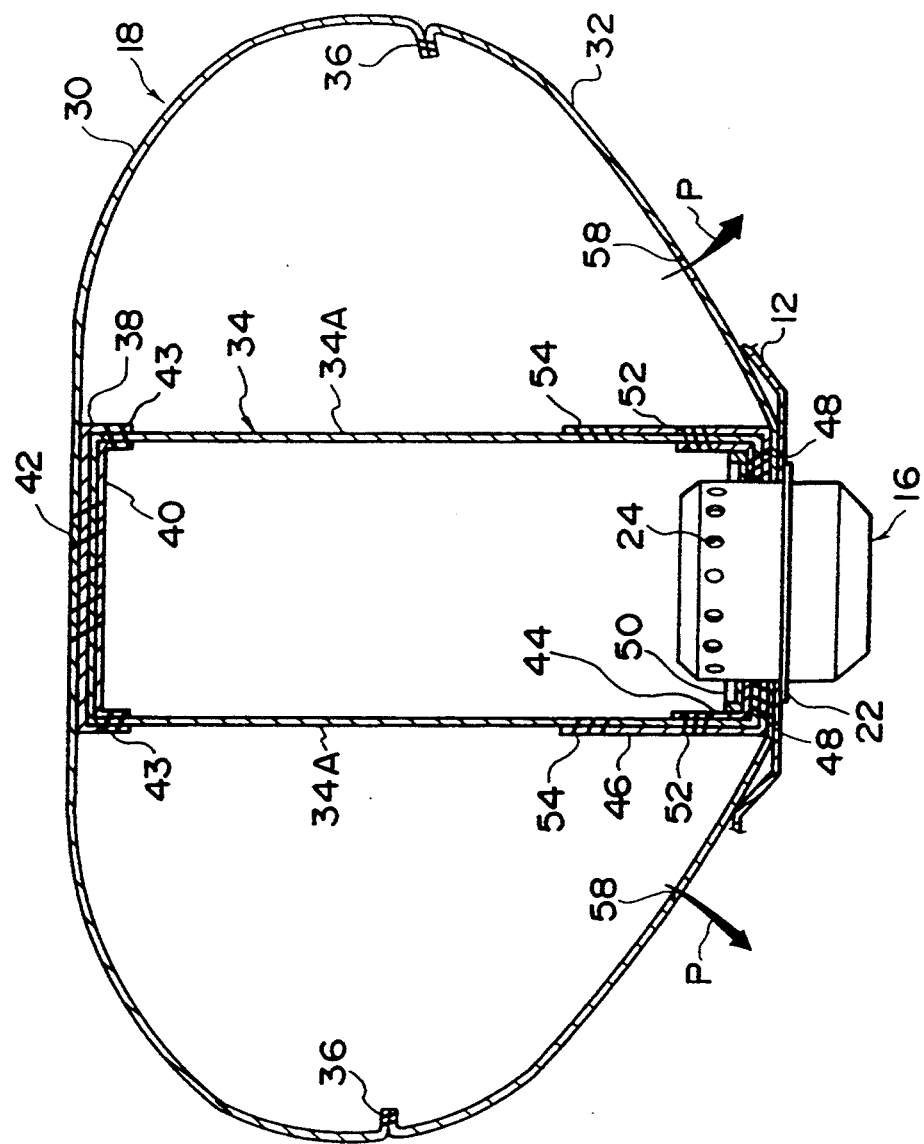
FIG. 1 is a cross-sectional view showing a bag body to which the present invention is to be applied, the view showing the manner in which the bag has been fully expanded and vent holes have been unblocked.
Figure 2:
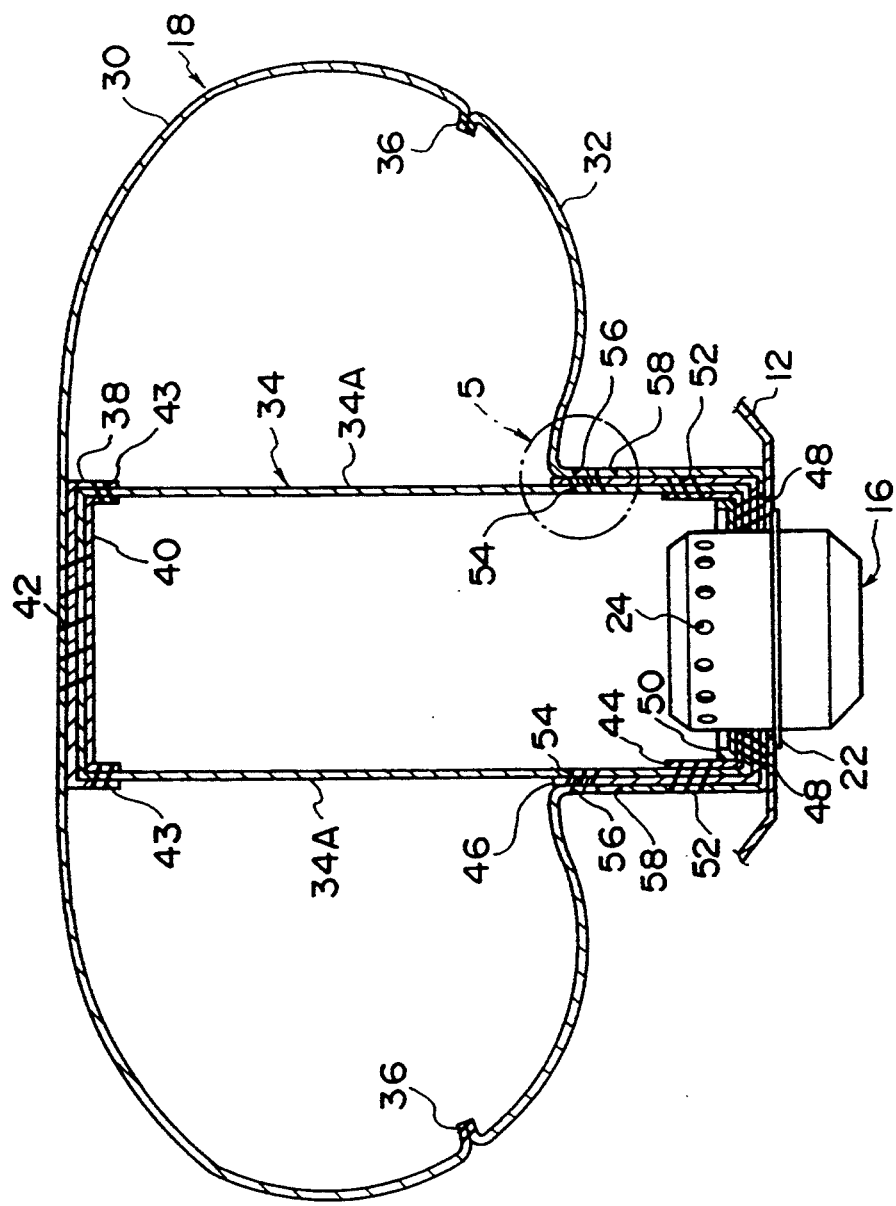
FIG. 2 is a cross-sectional view illustrating the bag in a state in which a predetermined tensile force is acting on each strap and in a state immediately before the vent holes are unblocked. The view corresponds to FIG. 1.
Figure 3:
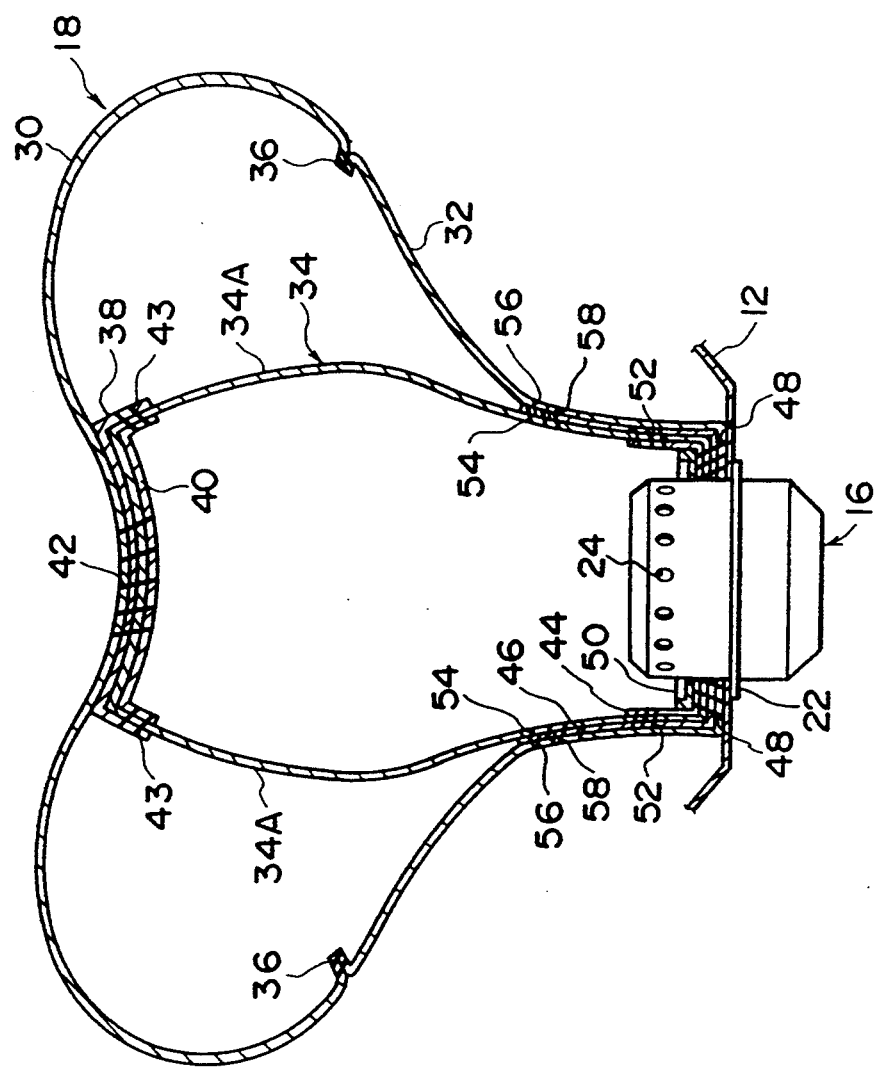
FIG. 3 is a cross-sectional view showing the bag during expansion and in a state in which the vent holes have been blocked. The view corresponds to FIG. 1.
Figure 5:
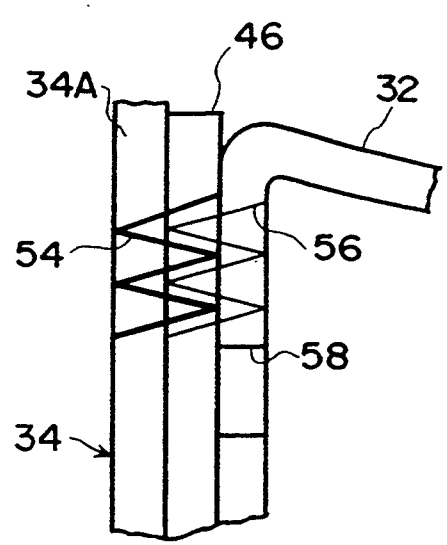
FIG. 5 is an enlarged view showing a portion indicated by arrow 5 in FIG. 2.

The bag 18 is disposed in a folded state on the occupant side of the base plate 12 and is accommodated between the base plate 12 and the pad 14. As shown in FIGS. 1 through 3, the bag 18 has a textile base 30 disposed on the occupant side, a textile base 32 disposed on the inflator side and a strap 34. These textile bases 30, 32 are formed of a fabric having excellent heat resistance and sealing properties. Incidentally, portions folded at respective portions which have been sewn with sewing thread seen in FIGS. 1 through 3 are not shown because they may be confused with the hatching such as the textile base 30 on the occupant side. However, the hatching such as the textile base 32 on the inflator side has been omitted in FIG. 5, but sewn-thread portions folded at a stitch 54 having a high strength and a stitch 56 having a low strength both of which will be described later, are shown in FIG. 5. Further, the stitches 54, 56 are constructed in such a manner that the sewn portions (at stitches other than the stitch 56) indicated by a thick line, shows high strength, whereas the sewn portion (at the stitch 56) indicated by a thin line shows low strength.

The textile base 30 and the textile base 32 are respectively circular in shape as seen from a plane, and are formed as a single unit by firmly sewing together their peripheral edges (the sewn-together-peripheral edges will hereinafter be referred to as "textile-base stitches 36"). The textile base 32 on the inflator side has a through hole (not shown) centrally defined therein. The occupant side half of the inflator 16 can be extended through the hole. After the process of sewing together the textile bases 30, 32 to form stitches 36, the textile base 30 on the occupant side and the textile base 32 on the inflator side pass through the through hole so as to be turned inside out, thus allowing the states shown in FIGS. 1 through 3.

The strap 34 is spans a central inner surface of the textile base 30 on the occupant side and the peripheral edge of the inflator 16 at the textile base 32 on the inflator side. A first strap-shaped reinforcing fabric 38 and a second strap-shaped reinforcing fabric 40 are respectively disposed on both sides of an area of the strap 34 on the occupant side (i.e., between a portion of the strap 34 on the occupant side and the textile base 30 on the occupant side and on the surface of the portion of the strap 34 on the inflator 16 side). The area of the strap 34 on the occupant side, the first and second strap-shaped reinforcing fabrics 38, 40 and the textile base 30 on the occupant side are firmly sewn together in the form of four layers one superimposed on another (the portion thus sewn will hereinafter be referred to as a "first stitch 42 on the occupant side"). Both ends of the first and second strap-shaped reinforcing fabrics 38, 40 are firmly sewn together (in the form of three layers one superimposed on another) with the strap 34 sandwiched therebetween (the portions thus sewn will hereinafter be referred to as "second stitches on the occupant side").

Each of a third strap-shaped reinforcing fabrics 44 is disposed on the surface of the peripheral edge of the inflator 16 on the occupant side (inner side) at the strap 34. Further, a ring plate 50 is disposed thereon on the occupant side. Each third strap-shaped reinforcing fabric 44 serves to prevent gas from flowing to the side of the base plate 12 opposite the side of the occupant from the surface of the ring plate 50 opposite the side of the occupant.

Strap valves 46 formed of a fabric are disposed between the peripheral edge of the inflator 16 at the strap 34 and the textile base 32 on the inflator side. A portion of the inflator 16 just below the flange 22 at the strap 34, the third strap-shaped reinforcing fabric 44 and the strap valve 46 respectively disposed on the occupant side and the side opposite the side of the occupant, the textile base 32 on the inflator side are firmly sewn together in the form of four flats superimposed on one another (each portion thus sewn will hereinafter be referred to as a "stitch 48 on the inflator side").

The peripheral edge of the bag 18 near the through hole, i.e., the stitches 48 on the inflator side are pressed toward the base plate 12 by fastening together the ring plate 50 and the flange 22 of the inflator 16 with unillustrated rivets or the like. Vertically-extending portions 34A formed between the stitches 48 on the inflator side and the second stitches 43 on the occupant side at the strap 34 are of a predetermined length. When the vehicle rapidly decelerates and the bag 18 has completely been expanded, from the occupant side, the bag 18 is seen as being in a flat state.

The peripheral edge of the inflator 16 at the strap 34, the third reinforcing fabric 44 and the strap valve 46 are firmly sewn in the form of three layer one superimposed on another even at a position that is slightly spaced apart from the stitches 48 on the inflator side (each portion thus sewn will hereinafter be referred to as an "intermediate stitch 52").

As shown in FIG. 5, the vertically-extending portion 34A of the strap 34 is firmly sewn to an end of the strap valve 46 in a 2-layer superimposed state at a position slightly displaced more toward the occupant side than the intermediate stitch 52 as shown in FIG. 1 (the portion thus sewn and shown in FIG. 5 will hereinafter be referred to as a "high strength stitch 54"). Each high strength stitch 54 is a first stitch portion of a valve member. The textile base 32 on the inflator side and the end of the strap valve 46 on the occupant side are temporarily sewn at the same position as that of each high strength stitch 54 (the temporarily-sewn portion will hereinafter be referred to as a "low strength stitch 56"). Each low strength stitch 56 is a second stitch portion of as a valve member.

A plurality of circular-shaped vent holes 58 (two of which are on both sides of the textile base 32 on the inflator side as shown in each of FIGS. 1 through 3) are defined in portions of the low strength stitches 56 at the textile base 32. These holes 58 are displaced slightly toward the inflator 16. Each of these vent holes 58 are closed or blocked by the strap valve 46 during three states comprising a state in which the bag 18 shown in FIG. 4 is folded, a state in which the bag 18 shown in FIG. 3 is expanding, and a state in which a predetermined tensile force is acting on each of the vertically-extending portions 34A of the strap 34 illustrated in FIG. 2. On the other hand, the textile base 32 on the inflator side is spaced away from the strap valve 46, i.e., opened when the bag 18 shown in FIG. 1 has completely expanded.

The operation of the present embodiment will now be described below.

When the vehicle is in a normal running state, the activating device 26 is inactivated. Therefore, the bag 18 is accommodated between the base plate 12 and the pad 14 in a folded state as illustrated in FIG. 4.

When the vehicle rapidly decelerates from the above state, the activating device 26 is activated to subject the gas generating material 28 in the inflator 16 to combustion. As a result, a large quantity of gas is produced so as to be instantaneously introduced into the bag 18 from the gas holes 24 of the inflator 16. When the bag 18 is expanding toward the occupant (i.e., in the direction indicated by the arrow A in FIG. 4) as shown in FIG. 3, the textile base 32 on the inflator side and the strap valve 46 are maintained in a sewn state by each low strength stitch 56. Accordingly, the vent holes 58 remain blocked in this state. Hence the gas is not discharged from the vent holes 58. A tensile force acting on each of the vertically-extending portions 34A of the strap 34 has not yet reached a predetermined value in this condition.

When the gas is further introduced into the bag 18 from the state shown in FIG. 3, the tensile force which acts on each vertically-extending portion 34A of the strap 34 reaches the predetermined value as shown in FIG. 2. In this condition, the displacement of the bag 18 in its expansion direction is restricted by each vertically-extending portions 34A of the strap 34. Therefore, the gas flows in the direction normal to the direction in which the bag 18 is expands. As a result, the bag 18 expands in a flat manner as seen from the occupant side.

When the gas further flows into the bag 18 from the state shown in FIG. 2, the sewn-thread portion at each low strength stitch 56 is snapped by the tensile force acting on each vertically-extending portion 34A of the strap 34 and the force for pressing the textile base 32 on the inflator side toward the outside from the inside thereof. Thus, each stitch 56 is released from its temporarily-sewn state. Even when each stitch 56 has been released from its temporarily-sewn state, the strap valve 46 and each vertically-extending portion 34A of the strap 34 are not released from their sewn state because the strap valve 46 and the vertically-extending portion 34A have been firmly sewn together by the high strength stitch 54. As a result, the textile base 32 on the inflator side is separated from the strap valve 46 as shown in FIG. 1 so as to bring each of the vent holes 58 into an unblocked state. Therefore, the gas in the bag 18 is discharged by a predetermined amount into the side opposite the side of the occupant through the vent holes 58 along the direction indicated by the arrow P in FIG. 1. Accordingly, the bag 18 is maintained at a preset internal pressure and hence its internal pressure does not reach a pressure higher than necessary.

The bag is further expanded in a vicinity of the connecting portion when the pressure in the bag exceeds the predetermined value and the bag is separated from the connecting member.

The fully expanded bag 18 breaks the pad 14 at the thin-wall portion 20 so as to unfold in a desired direction. As a result, the bag 18 is interposed between the steering wheel and the occupant.

As described above, strap valves 46, high strength stitches 54 and low strength stitches 56 have been provided in the present embodiment. Thus, the vent holes 58 are blocked by the strap valves 46 until the tensile force applied to the s trap 34 reaches a given value. On the other hand, when the tensile force applied to the strap 34 reaches the given value, each of the low strength stitches 56 is released from its temporarily-sewn state so as to separate the textile base 32 on the inflator side from each strap valve 46, thereby freeing the vent holes 58 from being blocked. Therefore, the gas is no longer discharged from the vent holes 58 while the bag 18 is expanding, thereby making it possible to immediately expand the bag 18.

Further, the internal pressure of the bag 18 can be maintained at a preset value because the gas is discharged from the vent holes 58 when the tensile force applied to the strap 34 has reached the given value. A reinforcing effect of the strap 34 can also be obtained by providing the strap valves 45.

in the present embodiment, the present invention has been applied to the bag 18 of the air bag apparatus 10, which is provided on the side of the driver's seat. However, the present invention is not necessarily limited to the present embodiment. The present invention may be applied to a bag of an air bag apparatus which is mounted on the side beside driver's seat.

In addition, the position at which the low strength stitch 56 is provided, may be more toward an occupant side as seen from the vent boles 58. This position can be suitably changed.

As has been described above, the bag employed in the air bag apparatus, according to the present invention can bring about a superior effect in that the bag can be rapidly expanded toward the occupant and maintained in an expanded state by a given internal pressure.

Having now fully described the invention, it will be apparent to those skilled in the art that many changes and modifications can be made without departing from the spirit or scope of the invention as set forth herein.

What is claimed is:

1. A bag suitable for use in an air bag apparatus which is activated when a vehicle rapidly decelerates, said bag being accommodated in said air bag apparatus in a folded state and expands toward an occupant when gas flows therein, said bag comprising;

a connecting member spanning portions of the inner surface of said bag, said connecting member serving to restrict the degree of expansion of said bag toward the occupant, said connecting member having a first end fixedly mounted on an inner surface of the bag on a first side of said bag which expands toward the occupant, said first side contacting the occupant when said air bag is fully expanded, and a second end fixedly mounted on a second side of said bag opposite said first side;

an aperture defined in the bag and capable of discharging gas therefrom; and blocking means for connecting said inner surface of said bag to said connecting member at a connecting portion with a predetermined connecting strength and for blocking said aperture of said bag wherein said bag is subsequently expanded in a vicinity of said connecting portion and said aperture is unblocked to discharge the air in said bag from said aperture after subsequent expansion of said bag when the pressure in said bag exceeds a predetermined value and said inner surface of said bag is peeled from said connecting member upon the rapid deceleration of the vehicle.

2. A bag for an air bag apparatus according to claim 1, wherein said blocking means has a stitch portion including a low strength stitch where said connecting member and said bag are sewn together so as to block said aperture, said blocking means being activated when the pressure in said bag reaches the predetermined value upon the rapid deceleration of the vehicle, said low strength stitch is broken to unblock said aperture.

3. A bag for an air bag apparatus according to claim 2, wherein said low strength stitch is provided in the vicinity of said aperture on said second side of said bag.

4. A bag for an air bag apparatus according to claim 3, further including a plurality of apertures wherein each of said apertures is blocked by said blocking means.

5. A bag for an air bag apparatus according to claim 4, wherein said connecting member includes a plurality of straps which are disposed in confronting relationship at substantially equal intervals from the center of said bag at said first end of said connecting member so that the first side of said bag is flat against the occupant when said bag is fully expanded.

6. A bag suitable for use in an air bag apparatus which is activated when a vehicle rapidly decelerates, said bag being accommodated in said air bag apparatus in a folded state and expands toward an occupant when gas flows therein, said bag comprising:

a connecting member spanning portions of the inner surface of said bag and being connected to a first side of said bag which expands toward the occupant and a second side of said bag opposite said first side, said connecting member serving to restrict the degree of expansion of said bag toward the occupant;

an aperture defined in the bag and capable of discharging gas therefrom; and blocking means for connecting said bag to said connecting member and for blocking said aperture wherein said aperture is unblocked when a force for separating said connecting member from said bag reaches a predetermined value upon the rapid deceleration of the vehicle, thereby discharging said gas from said aperture wherein said blocking means includes reinforcing members mounted on said connecting member, and said reinforcing members serve to reinforce said connecting member and block said aperture.

7. A bag for an air bag apparatus according to claim 6, wherein said blocking means includes a low strength stitch to connect said reinforcing members and said bag together so as to block said aperture, said blocking means being activated such that when a force for separating said reinforcing member from said bag reaches a predetermined value upon the rapid deceleration of the vehicle, said low strength stitch is broken to unblock said aperture.

8. A bag for an air bag apparatus according to claim 7, wherein said low strength stitch is provided in the vicinity of said aperture on said second side of said bag.

9. A bag for an air bar apparatus according to claim 8, further including a plurality of apertures wherein each of said apertures is blocked by said blocking means.

10. A bag for an air bag apparatus according to claim 9, wherein said connecting member includes a plurality of straps disposed in confronting relationship at substantially equal intervals from the center of said bag and extending from the first side of said bag to the second side opposite of the first side of said bag so that the surface of said bag is flat against the occupant when said bag is fully expanded.

11. A bag suitable for use in an air bag apparatus which is activated when a vehicle rapidly decelerates, said bag being accommodated in said air bag apparatus in a folded state and expands toward an occupant when gas flows therein, said bag comprising:

a plurality of straps each having one end fixedly mounted on an inner surface of said bag on a first side of said bag which expands toward the occupant and the other end fixedly mounted on an inner surface of said bag on a second side opposite the first side of the bag which expands toward the occupant, said straps being disposed in confronting relationship at substantially equal intervals from the center of said bag on the first side so that the surface of said bag on the first side is flat when said bag is fully expanded, said straps serving to restrict the degree of expansion of said bag toward the occupant;

at least one vent hole defined in the second side of said bag which is capable of discharging gas therefrom;

at least one strap valve mounted on said straps on the second side, said at least one strap valve blocking said at least one vent hole defined in said gad and reinforcing said straps;

a low strength stitch at which said at least one strap valve and said bag are sewn together, said low strength stitch being broken when a force for separating said at least one strap valve from said bag reaches a predetermined value upon the rapid deceleration of the vehicle so as to release said at least one vent hole from being blocked by said at least one strap valve, thereby enabling gas to be discharged from said at least one vent hole.

12. A bag for an air bag apparatus according to claim 11, wherein said low strength stitch is provided in the vicinity of said at least one vent hole on the first side of said bag.

13. A bag for an air bag apparatus according to claim 12, further including a plurality of strap valves and a plurality of vent holes wherein said plurality of vent holes are respectively blocked by said plurality of strap valves.

* * * * *